United States Patent
Wiley et al.

(10) Patent No.: US 9,551,799 B2
(45) Date of Patent: Jan. 24, 2017

(54) METHODS OF HYDROCARBON DETECTION USING SPECTRA DOMINANT FREQUENCY AND MEASURES OF ENERGY DECAY ON THE LOW SIDE AND HIGH SIDE OF SPECTRA DOMINANT FREQUENCY

(75) Inventors: Robert W. Wiley, Sugar Land, TX (US); Scott W. Peters, Houston, TX (US); Peter H. Wilson, Houston, TX (US)

(73) Assignee: Apex Spectral Technology, Inc., Houston, TX (US)

( * ) Notice: Subject to any disclaimer, the term of this patent is extended or adjusted under 35 U.S.C. 154(b) by 737 days.

(21) Appl. No.: 13/884,435

(22) PCT Filed: Oct. 12, 2011

(86) PCT No.: PCT/US2011/055888
§ 371 (c)(1),
(2), (4) Date: May 9, 2013

(87) PCT Pub. No.: WO2012/071115
PCT Pub. Date: May 31, 2012

(65) Prior Publication Data
US 2013/0238247 A1    Sep. 12, 2013

Related U.S. Application Data

(60) Provisional application No. 61/416,393, filed on Nov. 23, 2010.

(51) Int. Cl.
*G01V 1/30* (2006.01)
*G01V 1/36* (2006.01)

(52) U.S. Cl.
CPC ............... *G01V 1/307* (2013.01); *G01V 1/364* (2013.01)

(58) Field of Classification Search
CPC ........ G01V 1/307; G01V 1/364; G01V 1/288; G01V 1/30; G01V 1/306; G01V 1/282
(Continued)

(56) References Cited

U.S. PATENT DOCUMENTS

| 5,173,880 A | * | 12/1992 | Duren | G01V 1/282 367/21 |
| 5,414,674 A | * | 5/1995 | Lichman | G01V 1/30 367/21 |

(Continued)

FOREIGN PATENT DOCUMENTS

WO    2008/130978 A1    10/2008

OTHER PUBLICATIONS

Notification of First Office Action issued May 27, 2015, by the State Intellectual Property Office of the People's Repoublic of China in corresponding Chinese Patent Application No. CN201180056132.0 (8 pages).

(Continued)

*Primary Examiner* — Carol S Tsai
(74) *Attorney, Agent, or Firm* — Osha Liang LLP

(57) ABSTRACT

A method for detecting hydrocarbons including obtaining seismic trace data for a region of interest; processing, using a processor, the seismic trace data to calculate a signal spectrum for each of a plurality of locations in the region of interest; calculating a dominant frequency of the signal spectrum; calculating at least one measure of energy decay above the dominant frequency, calculating at least one measure of energy decay below the dominant frequency, and calculating at least one measure spectral shape of the signal spectrum, and locating a hydrocarbon reservoir in the region of interest using the at least one measure of energy decay below the dominant frequency, the at least one measure of energy decay above dominant frequency and the dominant (Continued)

frequency; or locating a hydrocarbon reservoir in the region of interest using the at least one measure of energy decay below the dominant frequency and the at least one measure of energy decay above dominant frequency; or and locating a hydrocarbon reservoir in the region of interest using the at least one measure of energy decay below the dominant frequency and the dominant frequency; or locating a hydrocarbon reservoir in the region of interest using the at least one measure of spectral shape and the dominant frequency.

7 Claims, 5 Drawing Sheets

(58) Field of Classification Search
USPC ..... 702/11, 12, 13, 6, 7, 10, 85; 367/73, 51, 367/52, 75, 38, 47, 31, 83, 49, 21
See application file for complete search history.

(56) References Cited

U.S. PATENT DOCUMENTS

| | | | | |
|---|---|---|---|---|
| 5,583,825 | A | * | 12/1996 | Carrazzone ............ G01V 1/306 367/31 |
| 6,058,074 | A | | 5/2000 | Swan et al. |
| 6,092,025 | A | * | 7/2000 | Neff ......................... G01V 1/30 702/10 |
| 6,982,927 | B2 | | 1/2006 | Taner |
| 7,243,029 | B2 | * | 7/2007 | Lichman ............... G01V 1/306 702/11 |
| 7,876,643 | B2 | * | 1/2011 | Wiley ...................... G01V 1/30 367/73 |
| 2005/0043892 | A1 | * | 2/2005 | Lichman ............... G01V 1/306 702/13 |
| 2008/0270033 | A1 | * | 10/2008 | Wiley ...................... G01V 1/28 702/13 |
| 2009/0080289 | A1 | * | 3/2009 | Wiley ...................... G01V 1/30 367/49 |
| 2013/0238247 | A1 | * | 9/2013 | Wiley ................... G01V 1/307 702/14 |

OTHER PUBLICATIONS

Examiner's Requisition (Office Action) dated Feb. 3, 2015, issued by the Canadian Intellectual Property Office in corresponding Canadian Patent Application No. CA 2,818,641 (3 pages).
International Search Report issued in PCT/US2011/055888 mailed on May 31, 2012 (2 pages).
Written Opinion of the International Searching Authority issued in PCT/US2011/055888 mailed on May 31, 2012 (7 pages).
PCT International Preliminary Report on Patentability (IPRP) with Written Opinion dated Jun. 6, 2013, from the International Bureau, Geneva, Switzerland, in related International Application No. PCT/US2011/055888 (8 pages).
Patent Examination Report No. 1 ("Office Action") issued Apr. 30, 2014, by the Australian Patent Office in corresponding Australian Patent Application No. 2011332299 (4 pages).
Examner's Requisition ("Office Action") issued by the Canadian Intellectual Property Office on Jan. 18, 2016, in related Canadian Patent Application No. CA 2,818,641 (6 pages).

* cited by examiner

METHODS OF HYDROCARBON DETECTION USING SPECTRA DOMINANT FREQUENCY AND MEASURES OF ENERGY DECAY ON THE LOW SIDE AND HIGH SIDE OF SPECTRA DOMINANT FREQUENCY

CROSS REFERENCE TO RELATED APPLICATIONS

This is a national phase application of PCT/US2011/055888, filed on Oct. 12, 2011, which claims the benefit of Provisional Application No. 61/416,393, filed on Nov. 23, 2010. This application claims the benefits of all these prior applications and incorporates the disclosures of these prior applications by referenve in their entirety.

FIELD OF THE INVENTION

This invention relates to methods and systems for hydrocarbon detection using seismic data.

BACKGROUND

Existing seismic exploration direct hydrocarbon detection methods primarily focus on the properties of the sound-reflecting boundaries present in the earth. These methods are founded on the theory that the strength of the sound reflection from the boundary itself is determined by certain lithological properties of rock within the layer above and the layer below a given boundary.

However, such reflection-based methods are far from perfect. Reflections at each point on a boundary depend on at least eight variables (P-wave velocity above, S wave velocity above, density above, P wave velocity below, S wave velocity below, density below, angle of the incident ray path and bed thicknesses which may cause tuning effects or the lack thereof). The interplay between these variables makes it difficult to determine any particular one with accuracy. Therefore methods that do not rely on the strength of the reflection boundary for direct detection are desirable.

Recent research indicates that the velocity of the seismic wave may vary with frequency in the presence of permeability and this frequency domain based phenomenon is independent of the strength of the reflection boundary. Measurements of this phenomenon can be used to image hydrocarbon reservoirs where hydrocarbons can move through the pore throats easier than brine.

SUMMARY

One aspect of the invention relates to methods for detecting hydrocarbons. A method in accordance with one embodiment of the invention includes obtaining seismic trace data for a region of interest; processing the seismic trace data to calculate at least one spectrum for at least one sample from the seismic data; calculating at least one dominant frequency ($\omega_D$) for the at least one spectrum; calculating at least one measure of energy decay at frequencies below a $\omega_D$ ($\alpha_L$) on at least one spectrum, calculating at least one measure of energy decay at frequencies above the at least $\omega_D$ ($\alpha_H$) on the at least one spectrum; and locating a hydrocarbon reservoir in the region of interest using the at least one $\omega_D$, the at least one measure $\alpha_H$ above $\omega_D$ and the at least one measure of $\alpha_L$ below $\omega_D$.

A different aspect of the invention also relates to methods for detecting hydrocarbons. A method in accordance with another embodiment of the invention includes obtaining seismic trace data for a region of interest; processing the seismic trace data to calculate at least one spectrum for at least one sample from the seismic data; calculating at least one $\omega_D$ for the at least one spectrum; calculating at least one measure of $\alpha_L$ on at least one spectrum, calculating at least one measure $\alpha_H$ on the at least one spectrum; and locating a hydrocarbon reservoir in the region of interest using at least one measure of $\alpha_L$ and at least one measure of $\alpha_H$.

A different aspect of the invention relates to methods for detecting hydrocarbons. A method in accordance with one embodiment of the invention includes obtaining seismic trace data for a region of interest; processing the seismic trace data to calculate at least one spectrum for at least one sample from the seismic data; calculating at least one $\omega_D$ for the at least one spectrum; calculating at least one measure of aL on at least one spectrum; and locating a hydrocarbon reservoir in the region of interest using the at least one $\omega_D$, and the at least one measure of $\alpha_L$.

A different aspect of the invention relates to methods for detecting hydrocarbons. A method in accordance with one embodiment of the invention includes obtaining seismic trace data for a region of interest; processing the seismic trace data to calculate at least one spectrum for at least one sample from the seismic data; calculating at least $\omega_D$ for the at least one spectrum; calculating at least one measure of spectral shape ("$\sigma_\omega$") in at least one spectrum; and locating a hydrocarbon reservoir in the region of interest using the at least one $\omega_D$, and the at least one measure of $\sigma_\omega$.

Other aspects and advantages of the invention will be apparent from the following description and the appended claims.

BRIEF DESCRIPTION OF THE DRAWINGS

Reference will be made to the accompanying drawings which are described as follows.

DETAILED DESCRIPTION

Figure 1:
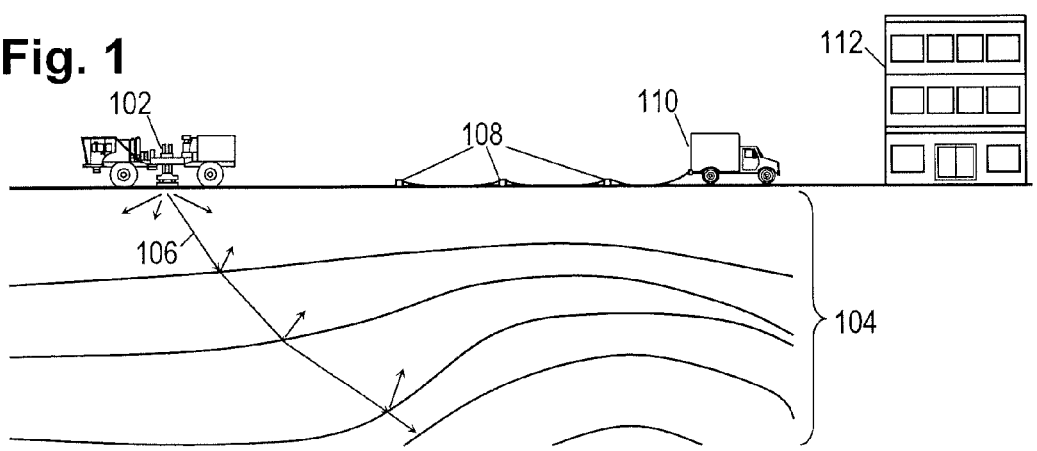
FIG. 1 shows an illustration in which hydrocarbon detection methods may be used.

Embodiments of the invention relate to methods and systems for hydrocarbon detection using seismic data. Specifically, embodiments of the invention include relying upon deriving three measurements from seismic data and then combining the three measurements to create a fourth measurement as indication for hydrocarbon detection. Alternatively, the three derived measurements may be interpreted together to indicate hydrocarbon locations. The three measurements derived from the seismic data include $\alpha_L$, $\omega_D$ and $\alpha_H$.

Another embodiment of the invention relies upon deriving two measurements from seismic data and then combining the two measurements to create a third measurement as indication for hydrocarbon detection. Alternatively, the two derived measurements may be interpreted together to indicate hydrocarbon locations. The two measurements derived from the seismic data include $\alpha_L$ and $\alpha_H$.

Another embodiment of the invention relies on deriving two measurements from seismic data and then combining the two measurements to create a third measurement as indication for hydrocarbon detection. Alternatively, the two derived measurements may be interpreted together to indicate hydrocarbon locations. The two measurements derived from the seismic data include $\alpha_L$, and $\omega_D$.

Another embodiment of the invention relies on deriving two measurements from seismic data and then combining the two measurements to create a third measurement as indication for hydrocarbon detection. Alternatively, the two derived measurements may be interpreted together to indicate hydrocarbon locations. The two measurements derived from the seismic data include the $\sigma_\omega$ and $\omega_D$.

$\omega_D$ may be identified from a spectrum at the maximum amplitude. One of ordinary skilled in the art would appreciate that the time domain seismic data may be converted into the frequency domain data sample by sample using any one of several transforms including, but not limited to the Fourier Transform or Fast Fourier Transform (FT or FFT) for such analysis. In addition, the data may be manipulated with various functions to facilitate the spectrum analysis. In accordance with embodiments of the invention, determination of $\omega_D$ may be performed with any suitable methods, one of which is described in U.S. patent application Ser. No. 11/788,910, which is incorporated by reference in its entirety.

Decay of energies of seismic waves traveling in a formation can be caused by various factors, including the types and quantities of hydrocarbons in the formation. Such decay may vary as a function of the frequencies. Therefore, analysis of energy decay as a function of frequency around the $\omega_D$ may provide some indication of the types and quantities of hydrocarbons in the formation. In particular, methods of the invention make use of $\alpha_L$ and of $\alpha_H$. There are numerous methods for determining the rate of energy decay such as those described as $1/Q_g$ in U.S. Pat. No. 7,243,029 B2 issued Jul. 10, 2007.

Decay of energies of seismic waves traveling in a formation can be caused by various factors, including the types and quantities of hydrocarbons in the formation. Such decay may vary as a function of the frequencies. Therefore, analysis of energy decay as a function of frequency around the $\omega_D$ may provide some indication of the types and quantities of hydrocarbons in the formation. In particular, methods of the invention make use of $\sigma_\omega$. One way to compute $\sigma_\omega$ is using the standard deviation of the spectrum for amplitudes of the spectrum over a user specified range.

Once $\omega_D$, $\alpha_L$, $\alpha_H$, and $\sigma_\omega$ have been determined these four measurements can be interpreted directly to determine where $\omega_D$ are relatively low, $\alpha_L$ values indicate rapid energy decay toward lower frequencies, and $\alpha_H$ values indicate rapid energy decay toward higher frequency values, and $\sigma_\omega$ indicates a narrow shape to identify locations of hydrocarbon accumulations. Alternatively, combinations of these four measurements can be used as inputs to another algorithm to calculate an additional dataset to identify regions of interest where end member values indicate hydrocarbons. These algorithms may use all four parameters or only a combination of two or three of the parameters to calculate the additional dataset.

The following description covers various illustrative embodiments of the invention. These systems and methods are not based on reflection-boundary analysis, but instead are based on changes to the seismic waves as they propagate through subsurface formations. When the seismic waves propagate through subsurface formations, their energies decay to various extents and in various manners, depending on the lithological properties of the formation including the matrix type, porosity, permeability, fluid type, bulk density, fluid viscosity, temperature, and pressure along the paths of propagation. One skilled in the art will appreciate that the following description is for illustrative purpose only and various modifications are possible without departing from the scope of the invention.

FIG. 1 shows an illustrative context for use of the disclosed systems and methods. A seismic source 102 such as a vibrator truck, a small explosion, or an air gun (in underwater surveys), generates seismic waves that propagate through subsurface formations 104. As shown by a selected propagation path 106, the seismic waves reflect and refract at boundaries between subsurface formations 104, and eventually some of the reflected seismic waves reach an array of receivers 108. The array typically includes numerous receivers 108 spaced in a grid pattern. Receivers 108 convert seismic waves into electrical signals that are then recorded at a recording facility 110 such as a recorder truck. Eventually, the recorded data is transported or transmitted to a central facility 112 for analysis.

Seismic source 102 typically fires multiple times at different locations relative to the array of receivers 108. The array of receivers 108 may then be moved and the process may be repeated many times. The use of multiple source and receiver locations allows data from different propagation paths to be combined in a manner that attenuates noise.

Figure 2:
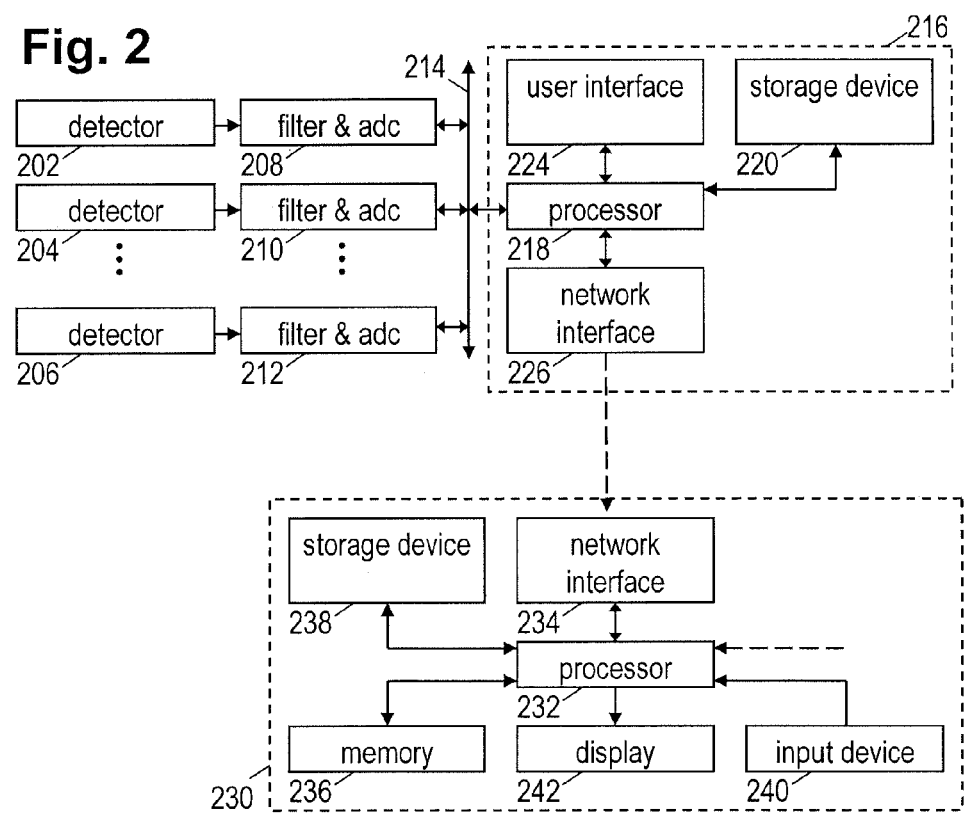
FIG. 2 shows a block diagram of various illustrative hydrocarbon detection systems.

FIG. 2 shows a block diagram of various systems and devices employed in gathering and analyzing seismic data. Detectors 202, 204, and 206 are transducers that convert seismic waves into electrical signals that are then amplified. Analog-to-digital converter (ADC) blocks 208, 210, and 212 receive the amplified electrical signals from detectors 202, 204, and 206, respectively. ADC blocks 208, 210, and 212 filter the amplified electrical signals and convert them to digital form. Digital sampling is performed at an interval of for example, 1-4 milliseconds. Each receiver 108 may include at least one detector and ADC block.

A bus 214 couples ADC blocks 208, 210, and 212 to a recording system 216. Bus 214 is a simplified representation of multiple wires, cables and/or wireless connections with corresponding adapters.

Illustrative recording system 216 may include a processor 218, a storage device 220, a user interface 224, and a network interface 226. Processor 218, for example, may collect and format the digital data from the receivers and may store the digital data in files on storage device 220. Alternatively, the digital data may be streamed over a network for remote storage. The files may include header information regarding the data in the file, e.g., the number of array receivers, the bit resolution of the digitized samples, the sampling rate, the starting time and length of the recording period, and the positions of the source and each receiver in the array. The seismic data samples may be multiplexed and written into the file as they are received. A new file may be created for each firing of the seismic source 102.

The manner of collecting and recording the data may be controlled via a user interface 224. Typically, user interface 224 includes a display upon which processor 218 shows options that can be configured by the user, and a keypad or other input device that the user can use to communicate the desired configuration to the processor 218. Once surveying is completed, the seismic data files may be transported or transmitted to a hydrocarbon detection system 230 via network interface 226.

In accordance with one embodiment of the invention, hydrocarbon detection system 230 may be a general-purpose computer configured for operation as a hydrocarbon detection system through the use of software. System 230 may include a processor 232, a network interface 234, a memory device 236, a storage device 238, an input device 240, and a display device 242. Network interface 234 may couple processor 232 to recording system 216 allowing processor 232 to retrieve software and data stored on recording system 216. Software stored on memory device 236 may configure processor 232 to interact with a user via input device 240 and display 242.

The user may cause processor 232 to perform a seismic data file processing program stored on storage device 238. Processor 232 typically begins program execution by causing some or all of the program to be copied into memory 236 for fast access. With guidance from the user, the data file processing program may retrieve seismic data files from storage device 238. The data file processing program may then perform pre-stack processing on the data, stacks the data, and stores the stacked data as a new seismic data set.

The user may then cause processor 232 to execute a hydrocarbon detection program. As with the data file processing program, processor 232 may begin execution by copying the hydrocarbon detection program into memory 236. With guidance from the user, the hydrocarbon detection program may configure processor 232 to retrieve traces from the raw seismic data files and/or from the stacked seismic data set. The hydrocarbon detection program may configure processor 232 to process the traces as described in greater detail below, eventually producing a section(s) or volume(s) for viewing by the user.

The following discussion describes various illustrative methods implemented by system 230. The corresponding figures show exemplary methods in the form of flowcharts having blocks to represent component operations, and arrows to represent potential operation sequences. System 230 may carry out the component operations of the various methods in the sequences shown or in a different order, or alternatively, many of the operations may be re-ordered, or performed concurrently. The methods are ultimately carried out by hardware, but the methods' control logic may be implemented in the software, firmware, and or hardware of system 230.

Figure 3:
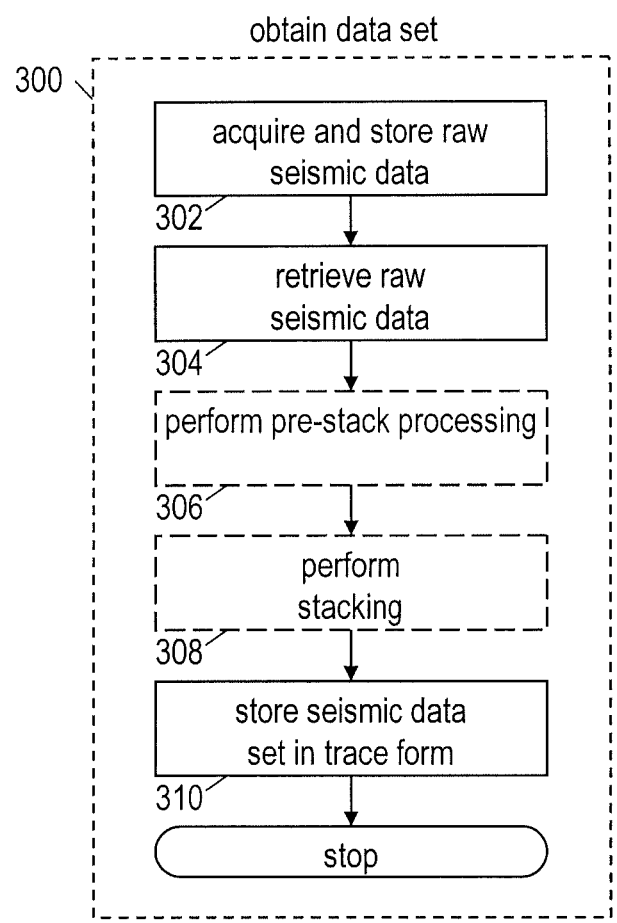
FIG. 3 shows a flowchart of an illustrative seismic data acquisition method.

In accordance with one embodiment of the invention, FIG. 3 shows a flowchart of an illustrative method 300 to obtain a seismic data set, including optional operations performed by a seismic data file processing program. In block 302, a recording system (shown as 216 in FIG. 2) acquires and records raw seismic data as described previously. In block 304, a hydrocarbon detection system (shown as 230 in FIG. 2) retrieves (with guidance from a user) the raw seismic data and reorders the digitized samples. As noted previously, recording system 216 may store the data as it is acquired. System 230 may convert the data file format to a trace-based format, i.e., the digitized samples are reordered to provide a separate time sequence for each receiver. System 230 may further associate each trace with a map location, which, for example, may be halfway between the receiver and the seismic source.

Method 300 includes two optional blocks 306 and 308, which can be omitted independently of each other. In block 306, system 230 may perform pre-stack processing. In block 308, system 230 may identify for each map location those traces having the map location as a midpoint between the receiver and the seismic source. These traces may be sorted based on offset, i.e., the distance between the map location and the receiver. System 230 then averages ("stacks") the identified traces having a common offset. Note that in some stacking variations system 230 may stack all the identified traces for a map location, after first stretching the traces in the time domain as a function of offset and estimated velocities. Stacking operation 308 further enhances the signal to noise ratio of the traces. In block 310, system 230 may store the reformatted (and optionally filtered and stacked) seismic data set on storage device (shown as 238 in FIG. 2).

Most seismic data processing software is configured to access seismic data in this trace-based format. Accordingly, system 230 may perform multiple hydrocarbon detection techniques without repeating the foregoing operations.

Figure 4:
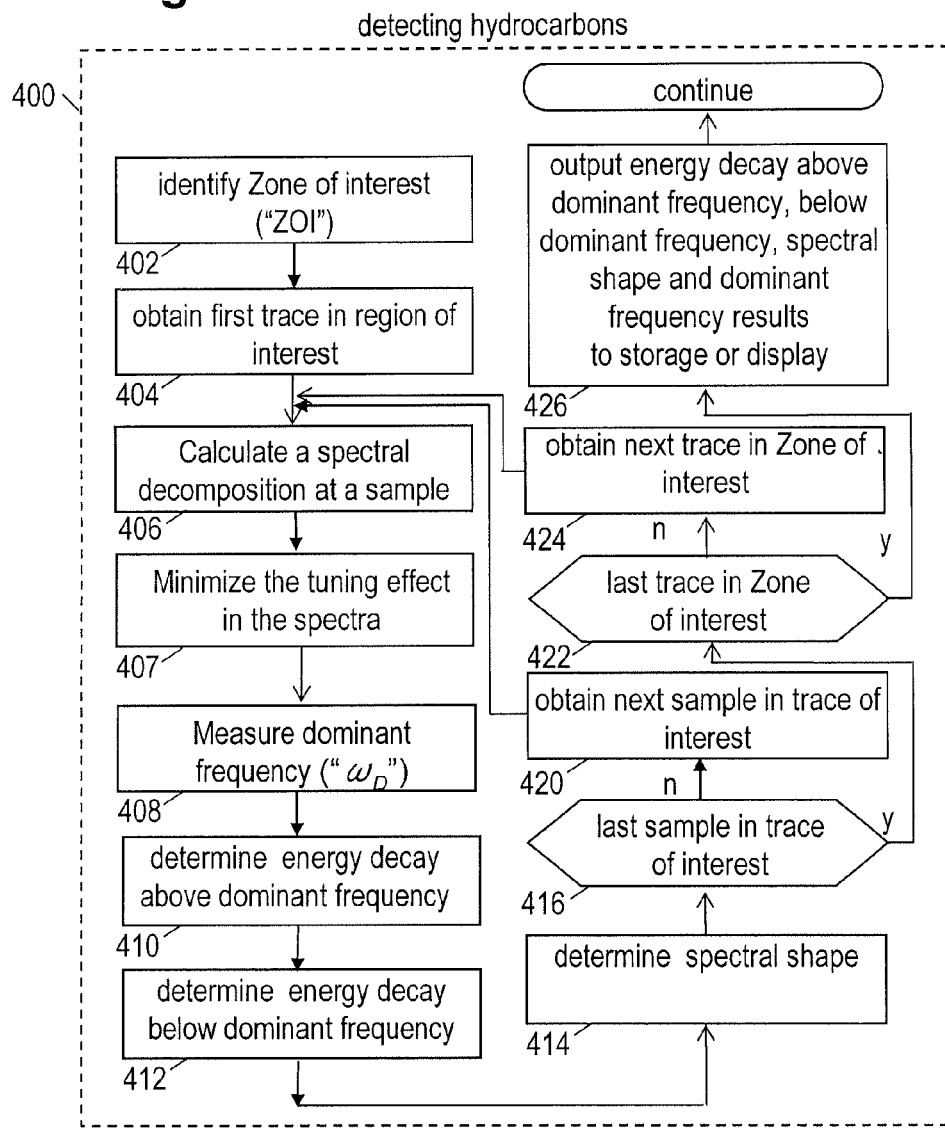
FIG. 4 shows a flowchart of an illustrative hydrocarbon detection method.
Figure 4:
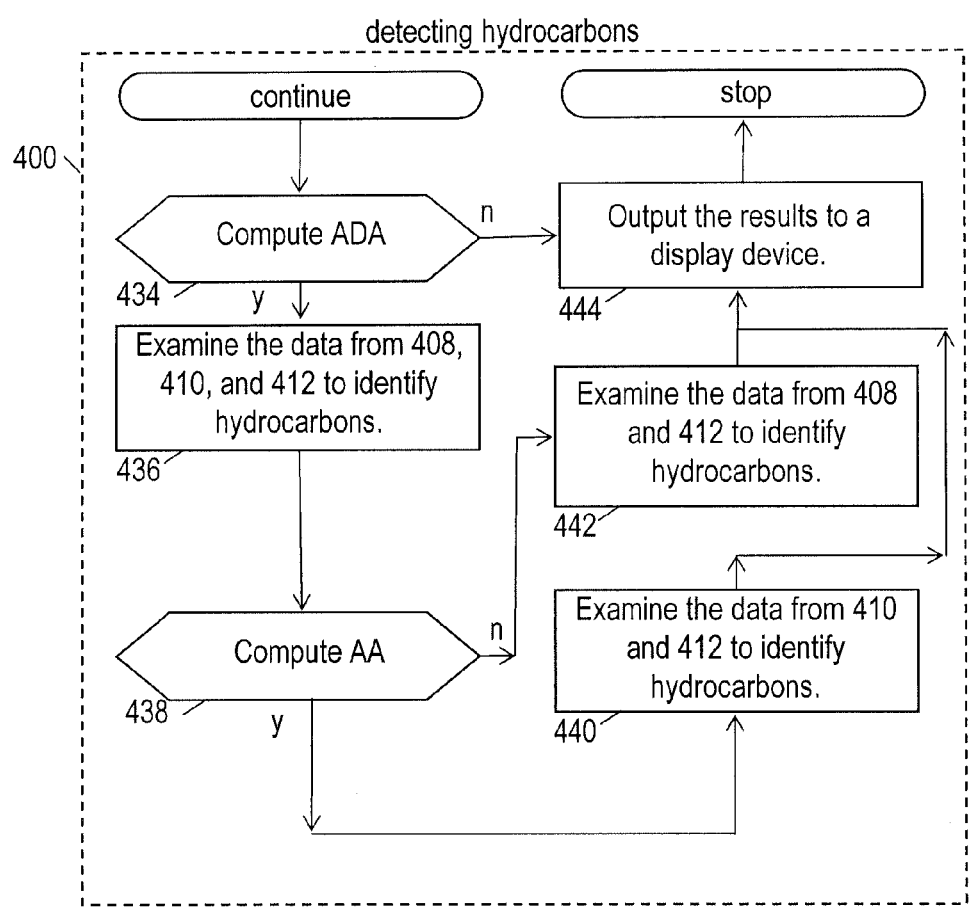

FIG. 4 shows a flowchart illustration of a hydrocarbon detection method 400 in accordance with one embodiment of the invention. Beginning in block 402, system 230 identifies (with guidance from a user) a zone of interest in the seismic dataset. The zone of interest may include the entire seismic data volume, or be a subset of the dataset. In block 404, system 230 begins working through the zone of interest systematically, obtaining a first trace from the seismic data set.

In block 406, system 230 calculates a frequency spectrum at a sample of interest in the seismic data, which is called a spectral decomposition at a sample (e.g., a selected window or interval on a trace). There are numerous methods of calculating a spectral decomposition at a sample. One example of such spectral decomposition is discussed in patent application number U.S. patent application Ser. No. 11/788,910.

In block 407, system 230 optionally minimizes the tuning effects that are in the spectral decomposition to enhance the measurements that follow. There are numerous methods for minimizing the tuning effects. One example of such is the method of computing the Smooth Signal Spectrum discussed in U.S. patent application Ser. No. 11/788,910.

In block 408, system 230 measures $\omega_D$ and outputs this measurement to a storage device for a sample. An $\omega_D$ is defined as the frequency at which the spectrum has the maximum magnitude. The method for determining the $\omega_D$ may include first calculating a signal spectrum (or a smooth signal spectrum) of the sample. The maximum magnitude of the signal spectrum or the smooth signal spectrum then defines $\omega_D$. The approach involving a smooth signal spectrum is described in U.S. patent application Ser. No. 11/788,910. However, methods of the invention do not necessarily involve the calculation of a smooth signal spectrum. Instead, methods of the invention may also determine the $\omega_D$ without first calculating a smooth signal spectrum.

In block 410, system 230 measures $\alpha_H$. There are several approaches to determining the rate of such energy decay. One example is to set a threshold level in the spectrum analysis and use the intercept where the threshold level intersects the spectral curve on the high side of $\omega_D$ as an indicator. The frequency at which this intercept occurs may be used as an indicator of col. Alternatively, the difference between $\omega_D$ and the frequency of the high side intercept may be used as an indicator of $\alpha_H$. Another form of indicator is to fit a curve to the spectrum between $\omega_D$ and the high side intercept point. The parameters of this curve would then define $\alpha_H$.

In block 412, system 230 measures $\alpha_L$. There are several approaches to determining the rate of such energy decay.

One example is to set a threshold level in the spectrum analysis and use the intercept where the threshold level intersects the spectral curve on the low side of $\omega_D$ as an indicator. The frequency at which this intercept occurs may be used as an indicator of $\alpha_L$. This could be the same threshold level used in block 410 or a different threshold level. Alternatively, the difference between $\omega_D$ and the frequency of the low side intercept point may be used as an indicator. Another form of indicator is to fit a curve to the spectrum between $\omega_D$ and the low side intercept point. The parameters of this curve would then define $\alpha_L$.

In block 414, system 230 measures $\sigma_\omega$. There are several approaches to determining the shape of the spectrum. One example is for the user to set the frequency range of interest and then to compute the standard deviation of the spectrum over that frequency range or to fit a curve to the spectrum over that frequency range. The user could use the same amplitude threshold level used in block 410 which would define the frequency range of interest or use different criteria. The parameters of the standard deviation of this curve would then define $\sigma_\omega$.

In block 416, system 230 determines whether the last sample on the trace being analyzed has been examined. If not, system 230 proceeds to block 420 to obtain another sample in the zone of interest and the steps 406-416 are repeated for the next sample. If the last sample in the trace has been analyzed, then system 230 proceeds to block 422.

In block 422, system 230 determines whether the last trace in the zone of interest has been examined. If not, system 230 proceeds to block 424 to obtain the next trace for analysis and the steps of 406-416 are repeated for the next trace. If block 422 determines that the last trace has been analyzed, system 230 proceeds to block 426 to output the results.

In block 426, system 230 outputs the results to storage or to the display device.

In block 434, system 230 determines whether the combined $\omega_D$, $\alpha_L$ and $\alpha_H$ ("ADA") output is desired. If yes, the system proceeds to block 436. If not, the system proceeds to block 438.

In block 436, system 230 performs further analysis on the results obtained from blocks 408, 410, and 412. The analysis may consist of various algorithms in order to highlight places where the $\omega_D$ and $\alpha_H$ both go lower than the trend and the measure of $\alpha_L$ goes higher than the trend. This indicates the presence of hydrocarbons, the hydrocarbons may be liquid or gas. The system then proceeds to block 444.

In block 438, system 230 determines whether the combined $\alpha_H$ and $\alpha_L$ ("AA") output is desired. If yes, system proceeds to block 440. If not desired, the system proceeds to block 442.

In block 436, system 230 performs further analysis on the results obtained from blocks 410, and 412. The analysis may consist of various algorithms in order to highlight places where the measure of $\alpha_H$ drops below the trend and $\alpha_L$ is higher that the trend. This indicates the presence of hydrocarbons, which may be liquid or gas. The system then proceeds to block 444.

In block 442, system 230 performs further analysis on the results obtained from blocks 408, and 412. The analysis may consist of various algorithms in order to highlight places where the $\omega_D$ is lower than the trend and $\alpha_L$ is higher that the trend. This indicates the presence of hydrocarbons, which may be liquid or gas. The system then proceeds to block 444.

In block 442, system 230 performs further analysis on the results obtained from blocks 408, and 412. The analysis may consist of various algorithms in order to highlight places where the $\omega_D$ is lower than the trend and the measure of $\sigma_\omega$ is anomalous from trend. This indicates the presence of hydrocarbons, which may be liquid or gas. The system then proceeds to block 444.

In block 444, system 230 outputs the summed results to a storage or to a display device.

$\omega_D$ is independent of amplitude of the seismic signals but is dependent on the interplay of, among other things, reservoir fluid properties (gas, oil, water and/or a mixture thereof), reservoir porosity, permeability, and the spectral shape and energy level of the seismic wave just before it enters the hydrocarbon reservoir.

Figure 5:
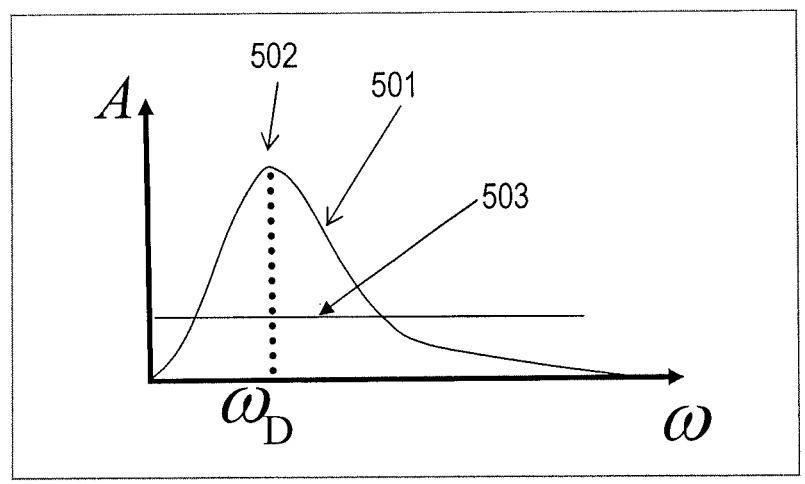
FIG. 5 shows graphically a spectrum calculated at a sample, the measurement $\omega_D$, and a user defined threshold.

FIG. 5 shows a spectrum calculated at a sample as curve 501, $\omega_D$ is labeled 502 and a user defined threshold is line 503. The threshold 503 may be defined at any level between zero and the amplitude of the $\omega_D$. Reasonable values would be between 1% of the amplitude of the $\omega_D$ and 30% of the amplitude of $\omega_D$. It is desirable to set this level above zero to avoid large changes in the measured value caused by tiny changes in the level. It is also desirable to set this level below the amplitude of $\omega_D$ since at this level the measured value goes to zero. The selection of a threshold is interpretational and is made partially based on the interpreted noise level in the spectrum the objective being to set the threshold above the noise level.

Figure 6:
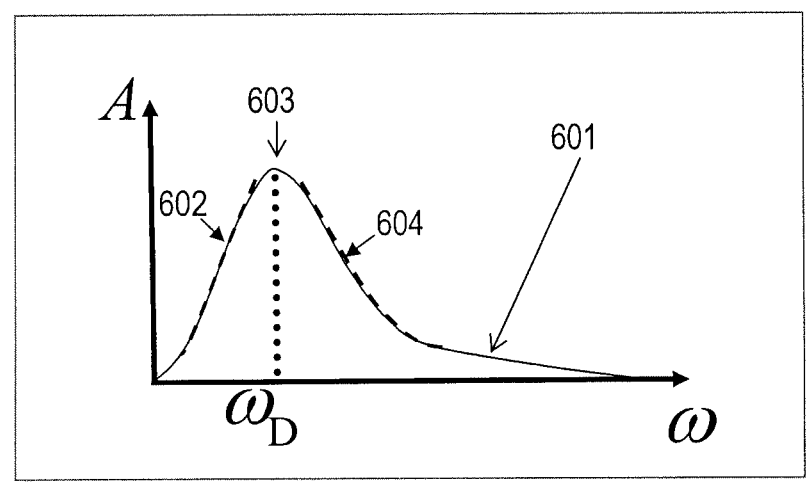
FIG. 6 shows graphically a spectrum calculated at a sample, the $\alpha_L$ measurement, the $\omega_D$ measurement and the ax measurement.

FIG. 6 shows a spectrum calculated at a sample as curve 601 and the $\omega_D$ is labeled as 603. The $\alpha_H$ indicator is shown as curve 604 and $\alpha_L$ indicator is shown as curve 602.

Though the foregoing methods and operations have been described with respect to seismic trace data having a time axis, they may readily be adapted to seismic trace data having a depth axis.

In accordance with some embodiments of the invention, any known 3D digital output format may be used with embodiments of the invention, such as SEGY format (Barry et al., "Recommended Standards for Digital Tape Formats," Digital Tape Standards, Society of Exploration Geophysics, 1980).

While specific embodiments of the invention have been disclosed and described above, the invention is not limited by the discussion, but instead is limited only by the scope of the appended claims.

What is claimed is:

1. A method for detecting hydrocarbons, comprising a hydrocarbon detection system for operation including a processor to execute a hydrocarbon detection program stored in a memory for:

providing seismic waves via at least one seismic source; receiving the seismic waves via at least one receiver as raw seismic data; acquiring raw seismic data from the at least one receiver; converting seismic trace data for a region of interest from the raw seismic data using the hydrocarbon detection system; processing the seismic trace data to calculate at least one spectrum for at least one sample from the seismic data; calculating at least one dominant frequency ($\omega_D$) for the at least one spectrum, wherein $\omega_D$ is the frequency at which the largest amplitude In the spectrum occurs; calculating at least one measure of energy decay at frequencies above the at least one $\omega_D$ (high side energy decay) on the at least one spectrum; calculating at least one measure of energy decay at frequencies below the at least one $\omega_D$ (low side energy decay) for the at least one spectrum; locating a hydrocarbon reservoir in the region of interest using the at least one $\omega_D$ and the at least one measure of energy decay at frequencies below the at least one dominant frequency and the at least one measure of energy decay at frequencies above the at least one $\omega_D$; and outputting an indication of the presence of the hydrocarbons from the hydrocarbon detection system to a display or storage.

2. The method of claim 1, wherein the measures of energy decays at frequencies below and above the at least one $\omega_D$ are $\alpha_L$ and $\alpha_H$, respectively, wherein $\alpha_L$ and $\alpha_H$ are determined by:

$$A(\omega) = \begin{cases} a_1 + a_2 e^{\alpha_L \omega} & \text{for } f_0 \leq \omega < \omega_D \\ a_3 + a_4 e^{\alpha_H \omega} & \text{for } \omega_D \leq \omega < f_2 \end{cases}$$

wherein $A(\omega)$ is the curve that best fits the spectrum, $f_0$ is the frequency at which the calculated spectrum crosses a user selected threshold on the low-frequency side of the dominant frequency ($\omega_D$), and $f_2$ is the frequency at which the calculated spectrum crosses a user selected threshold on the high-frequency side of the dominant frequency ($\omega_D$).

3. The method of claim 1, wherein prior to the calculating the at least one $\omega_D$, the at least one measure of high side energy decay, and the at least one measure of low side energy decay, a smooth signal spectrum is calculated from the signal spectrum, wherein the smoothed signal spectrum is used in calculating at least one $\omega_D$, at least one measure of low side energy decay, and/or calculation at least one measure of high side energy decay.

4. The method of claim 1, wherein the locating involves normalizing the at least one $\omega_D$, the at least one measure of low side energy decay and the at least one measure of high side energy decay.

5. The method of claim 1, wherein the locating involves identifying a region where the at least one $\omega_D$ decreases in value, the at least one measure of high side energy decay indicates more rapid decay, and the at least one measure of low side energy decay indicates more rapid decay.

6. The method of claim 1, wherein the locating involves identifying a region where the at least one measure of high side energy decay indicates more rapid decay, and the at least one measure of low side energy decay indicates more rapid decay.

7. The method of claim 1, wherein the locating, involves identifying a region where the at least one $\omega_D$ decreases in value, and the at least one measure of low side energy decay indicates more rapid decay.

* * * * *